United States Patent [19]

Perez-Albuerne

[11] E Re. 29,210

[45] Reissued May 10, 1977

[54] SYNTHESIS OF CHALCOGENATED POLYACENES

[75] Inventor: Evelio A. Perez-Albuerne, Rochester, N.Y.

[73] Assignee: Eastman Kodak Company, Rochester, N.Y.

[22] Filed: Mar. 1, 1976

[21] Appl. No.: 662,382

Related U.S. Patent Documents

Reissue of:

[64] Patent No.: 3,723,417
Issued: Mar. 27, 1973
Appl. No.: 149,056
Filed: June 1, 1971

[52] U.S. Cl. ..... 260/327 B; 260/327 M; 260/327 R; 252/500

[51] Int. Cl.[2] ..... C07D 341/00

[58] Field of Search ..... 260/327 B, 327 M, 327 R

[56] References Cited

OTHER PUBLICATIONS

Chemical Abstracts, vol. 44, cols. 3399–3401 (1950), abstracting Marschalk et al., "Bull. Soc. Chim France," (1948), pp. 418–428.

*Primary Examiner*—Cecilia M. S. Jaisle
*Attorney, Agent, or Firm*—Arthur H. Rosenstein

[57] ABSTRACT

Chalcogenated polyacenes including organic semiconductors such as tetrathiotetracene, [ tetraselenotetracene ], and hexathiopentacene are produced by reaction of a polyacene with elemental sulfur, [ selenium, and tellurium ] in the presence of nitrogen-containing hot solvents, preferably alkylated amides. N,N-dimethylformamide is the preferred solvent. The disclosed method of synthesis produces substituted polyacenes of high yield and purity in considerably shorter reaction times than achievable by prior art methods.

8 Claims, No Drawings

SYNTHESIS OF CHALCOGENATED POLYACENES

Matter enclosed in heavy brackets [ ] appears in the original patent but forms no part of this reissue specification; matter printed in italics indicates the additions made by reissue.

The present invention relates to novel methods for preparing chalcogen-substituted polyacenes and particularly to methods for preparing tetracene and pentacene compounds in which sulfur [, selenium, or tellurium ] atoms are attached to interior reactive carbon atoms of the polyacene nucleus to form heterocyclic rings with the nucleus.

Certain polyacenes, notably tetrathiotetracene, [ tetraselenotetracene, ] and hexathiopentacene are known to have low electrical resistivity. Tetrathiotetracene, for example, which has the formula:

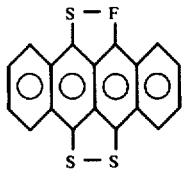

is reported by Matsunaga in J. Chem. Phys., 42, 2248 (1965) as possessing a specific resistance of 104Ω at 15° C when in molded form. Accordingly, such compounds are useful as organic semiconductors at room temperature. Additionally, these compounds have utility in that they readily form ion-radical salts which are themselves organic semiconductors having even lower electrical resistivity. Matsunaga U.S. Pat. No. 3,403,165 discloses such tetrathiotetracene ion-radical salts and their semiconductive properties.

Synthesis of substituted polyacenes has been carried out in the past by reacting a polyacene with an elemental chalcogen such as sulfur, selenium, and tellurium in the presence of hot solvent such as trichlorobenzene or Dowtherm, a eutectic of biphenyl and biphenyl oxide sold by the Dow Chemical Company. For example, tetrathiotetracene is ordinarily synthesized by reacting tetracene with elemental sulfur in hot trichlorobenzene. Synthesis carried out by this method produces considerable amounts of undesirable by-products and requires a reaction time of from 20 to 24 hours.

Another method for producing chalcogen-substituted polyacene compounds involves the reaction of a halogenated polyacene with an elemental chalcogen in the presence of trichlorobenzene. Tetrathiotetracene can be prepared according to this method by reacting elemental sulfur with 5,11-dichlorotetracene in trichlorobenzene. This method requires the additional step of halogenating the tetracene.

Still another method for producing tetrathiotetracene involves heating sulfur monochloride and tetracene in trichlorobenzene. Sulfur monochloride is a very powerful reagent which must be freshly distilled before use. In addition, the reaction is carried out in a current of carbon dioxide and tends to produce significant amounts of undesirable by-products.

Accordingly, the present invention is directed to overcoming the deficiencies of the prior art by providing methods for producing chalcogen-substituted polyacenes which require relatively short reaction times while practically eliminating substantial amounts of undesirable by-products. Additionally, the present invention requires no prior synthesis of halogenated reactant or use of a strong oxidizing agent. Further, the present invention produces high yields of relatively pure products which can ordinarily be utilized without further purification.

It has been discovered that the shortcomings of the prior art methods for producing chalcogen-substituted polyacenes, particularly those having the general formulas:

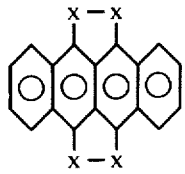

and

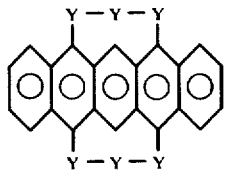

wherein X and Y each represent [ identical atoms selected from the group consisting of ] sulfur [, selenium, and tellurium, ] can be overcome by reacting an elemental [ chalcogen selected from the group consisting of ] sulfur [ selenium, ] and tellurium with a polyacene such as tetracene or pentacene in the presence of a reaction solvent comprising a nitrogen-containing organic solvent, preferably an alkylated amide maintained at high temperatures, usually at about reflux temperatures. Preferred alkylated amides useful in carrying out the method of the present invention include N,N-dimethylformamide, N,N-diethylformamide, N,N-dimethylacetamide, and N,N,N′,N′-tetramethylurea. N,N′-dimethylformamide is the solvent most preferred when carrying out the method of the present invention.

Effectiveness of the novel methods of synthesis provided by the present invention is demonstrated by the following examples.

EXAMPLE 1

Tetracene (20 g.) and flowers of sulfur (40 g.) are placed in a flask containing 500 ml. of N,N-dimethylformamide. The reaction mixture is heated to boiling, and boiling is continued for about 3½ hours. Small additions of N,N-dimethylformamide are made at intervals to replace the solvent lost by evaporation. After the reaction is completed the insoluble dark green product is separated by filtering while still hot and is finally washed with benzene and ligroine. After drying under ambient conditions, a yield of 29.3 g. (94.8 percent) of tetrathiotetracene is obtained. Comparison of the infrared spectrum of this product with that of purified authentic samples of tetrathiotetracene reveals the presence of only minor impurities. The product, as prepared above, is then successfully utilized without further purification to prepare ion-radical derivatives of tetrathiotetracene as described by Matsunaga in U.S. Pat. No. 3,403,165.

Elemental analysis of a typical sample of tetrathiotetracene prepared by the method of Example 1 is as follows:

Theory (percent): C, 61.4; H, 2.3; S, 36.4; Cl, 0; N, .0

Found (percent): C, 61.1; H, 2.5; S, 36.4; Cl, <.1; N, <.1

EXAMPLE 2

Tetracene (0.7 g.) and flowers of sulfur (1.4 g.) are placed in a flask containing 30 ml. of N,N,N',N'-tetramethylurea and provided with a reflux condenser. The mixture is heated to boiling, and refluxed for about 3 hours. The insoluble product is then filtered and washed with benzene and ligroine. After drying, a yield of 0.96 g. (89 percent) of tetrathiotetracene is obtained.

EXAMPLE 3

A procedure identical to that of Example 2 is used with the exception that 1 g. of tetracene, 2 g. of flowers of sulfur, and 50 ml. of N,N-dimethylacetamide are used as reagents. The yield of tetrathiotetracene is 1.2 g. (78 percent).

EXAMPLE 4

A reaction is carried out as described in Example 3 with the exception that N,N-diethylformamide is used as solvent, the reaction time is 2¼ hours, and the product is recovered after the reaction medium is cooled to room temperature. The yield of tetrathiotetracene is 0.93 g. (60 percent).

EXAMPLE 5

Pentacene (1 g.) and flowers of sulfur (2 g.) are placed in a flask containing 40 ml. of N,N-dimethylformamide and provided with an air-cooled reflux condenser. The mixture is heated to boiling, under a blanket of nitrogen gas, and refluxed in the dark for about 3½ hours. The insoluble product is then filtered hot and washed with benzene and ligroine. After drying in air, a yield of 1.15 g. (68.5 percent) of blue-green hexathiopentacene is obtained.

[ EXAMPLE 6

A reaction can be carried out as described in Example 2 with the exception that 3.5 g. of selenium are used instead of flowers of sulfur to yield tetraselenotetracene. ]

The invention has been described in detail with particular reference to certain preferred embodiments thereof, but it will be understood that variations and modifications can be effected within the spirit and scope of the invention.

I claim:

1. In a method for preparing a compound having the formula:

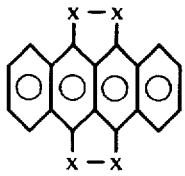

or

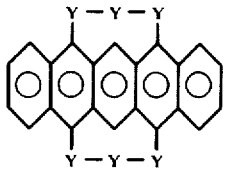

wherein X and Y each represent identical atoms selected from the group consisting of sulfur [, selenium, and tellurium, ] by a reaction of elemental [ chalcogen selected from the group consisting of ] sulfur [, selenium, and tellurium ] and a polyacene selected from the group consisting of tetracene and pentacene in the presence of a hot solvent, the improvement which comprises employing an alkylated amide as said solvent.

2. A method for preparing a compound having the formula:

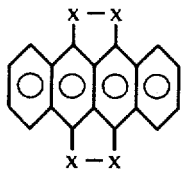

or

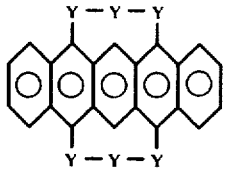

wherein X and Y each represent identical [ atoms selected from the group consisting of ] sulfur [, selenium, and tellurium ] which comprises reacting an elemental [ chalcogen selected from the group consisting of ] sulfur [, selenium, and tellurium ] with a polyacene selected from the group consisting of tetracene and pentacene in the presence of a reaction solvent comprising an alkylated amide maintained at about reflux temperatures.

3. A method for preparing a compound having the formula:

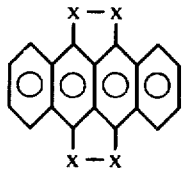

wherein X represents identical atoms [ selected from the group consisting of ] sulfur [, selenium, and tellurium ] which comprises reacting an elemental [ chalcogen selected from the group consisting of ] sulfur [, selenium, and tellurium ] with tetracene in the presence of a reaction solvent comprising an alkylated amide maintained at about reflux temperatures.

4. A method for preparing a compound having the formula:

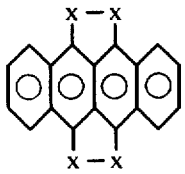

wherein X represents identical atoms [ selected from the group consisting ] of sulfur [ , selenium, and tellurium ] which comprises reacting an elemental [ chalcogen selected from the group consisting of ] sulfur [ , selenium, and tellurium ] with tetracene in the presence of a reaction solvent comprising an alkylated amide maintained at about reflux temperatures, said alkylated amide selected from the group consisting of N,N-dimethylformamide, N,N-diethylformamide, N,N-dimethylacetamide, and N,N,N′,N′-tetramethylurea.

5. The method according to claim 4 wherein said alkylated amide is N,N-dimethylformamide.

[ 6. The method according to claim 4 wherein the elemental chalcogen is selected from the group consisting of sulfur and selenium, and the alkylated amide is N,N-dimethylformamide. ]

[ 7. The method according to claim 6 wherein the elemental chalcogen is sulfur and the alkylated amide is N,N-dimethylformamide. ]

[ 8. The method according to claim 6 wherein the elemental chalcogen is selenium and the alkylated amide is N,N-dimethylformamide. ]

9. A method for preparing a compound having the formula:

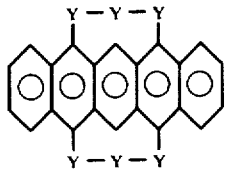

wherein Y represents identical atoms [ selected from the group consisting ] of sulfur [ , selenium, and tellurium, ] which comprises reacting an elemental [ chalcogen selected from the group consisting of ] sulfur [ , selenium, and tellurium ] with pentacene in the presence of a reaction solvent comprising an alkylated amide maintained at about reflux temperatures.

10. A method for preparing a compound having the formula:

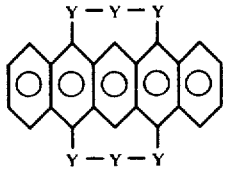

wherein Y represents identical atoms [ selected from the group consisting ] of sulfur [ , selenium, and tellurium ] which comprises reacting an elemental [ chalcogen selected from the group consisting of ] sulfur [ , selenium, and tellurium ] with pentacene in the presence of a reaction solvent comprising an alkylated amide maintained at about reflux temperatures, said alkylated amide selected from the group consisting of N,N-dimethylformamide, N,N-diethylformamide, N,N-dimethylacetamide, and N,N,N′,N′-tetramethylurea.

11. The method according to claim 10 wherein said alkylated amide is N,N-dimethylformamide.

[ 12. The method according to claim 10 wherein the elemental chalcogen is sulfur and the alkylated amide is N,N-dimethylformamide. ]

* * * * *